United States Patent [19]

Breitschaft et al.

[11] Patent Number: 4,784,668
[45] Date of Patent: Nov. 15, 1988

[54] NOVEL HETEROCYCLE-CONTAINING TRISAZO DYES

[75] Inventors: Walter Breitschaft, Ludwigshafen; Udo Mayer, Frankenthal; Guenther Seybold, Neuhofen, all of Fed. Rep. of Germany

[73] Assignee: BASF Aktiengesellschaft, Rheinland, Fed. Rep. of Germany

[21] Appl. No.: 49,225

[22] Filed: May 13, 1987

[30] Foreign Application Priority Data

May 30, 1986 [DE] Fed. Rep. of Germany ....... 3618265

[51] Int. Cl.⁴ .................... D06P 3/32; C09D 11/00
[52] U.S. Cl. ...................................... 8/437; 534/754; 106/22
[58] Field of Search ............... 534/754; 106/22; 8/437

[56] References Cited

U.S. PATENT DOCUMENTS 2,676,957  4/1954  Armento ........................... 534/754
3,998,803  12/1976  Burkhard et al. .................. 534/772
4,342,684  8/1982  Frank et al. ....................... 534/740
4,468,348  8/1984  Wicki .................................. 534/614

FOREIGN PATENT DOCUMENTS 2400515  1/1973  Fed. Rep. of Germany .
2347849  9/1973  Fed. Rep. of Germany .
2500426  7/1975  Fed. Rep. of Germany .
763064   12/1956  United Kingdom .

Primary Examiner—Paul Lieberman
Assistant Examiner—Ronald A. Krasnow
Attorney, Agent, or Firm—Oblon, Fisher, Spivak, McClelland & Maier

[57] ABSTRACT

Compounds which, in the form of the free acid, are of the general formula I

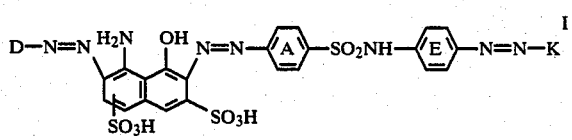

where
D is phenyl which unsubstituted or substituted by fluorine, chlorine, bromine, nitro, cyano, $C_1$–$C_4$-alkylsulfonyl, $C_1$–$C_8$-alkyl, $C_1$–$C_4$-alkoxy, carboxyl, $C_1$–$C_4$-alkoxycarbonyl or hydroxysulfonyl or by unsubstituted or substituted carbamyl or sulfamyl, and
K is a radical of a heterocyclic coupling component, and the rings A and E may furthermore be substituted by methyl, methoxy, chlorine or hydroxysulfonyl.

3 Claims, No Drawings

NOVEL HETEROCYCLE-CONTAINING TRISAZO DYES

The present invention relates to compounds of the formula I

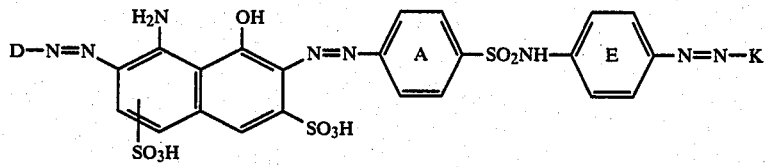

(I)

where
- D is phenyl which is unsubstituted or substituted by fluorine, chlorine, bromine, nitro, cyano, $C_1-C_4$-alkylsulfonyl, $C_1-C_8$-alkyl, $C_1-C_4$-alkoxy, carboxyl, $C_1-C_4$-alkoxycarbonyl, hydroxysulfonyl, carbamyl, $C_1-C_4$-mono- or dialkylcarbamyl, pyrrolidinocarbonyl, piperidinocarbonyl, morpholinocarbonyl, piperazinocarbonyl, N-($C_1-C_4$-alkyl)-piperazinocarbonyl, sulfamyl, $C_1-C_4$-mono- or dialkylsulfamyl, pyrrolidinosulfonyl, piperidinosulfonyl, morpholinosulfonyl, piperazinosulfonyl or N-($C_1-C_4$-alkyl)-piperazinosulfonyl and
- K is a radial of a heterocyclic coupling component, and the rings A and E may furthermore be substituted by methyl, methoxy, chlorine or hydroxysulfonyl, and their salts.

$C_1-C_4$-mono- or dialkylcarbamyl or -sulfamyl is, for example, $CONHCH_3$, $CONHC_2H_5$, $CONHC_3H_7$, $CONHC_4H_9$, $CON(CH_3)_2$, $CON(C_2H_5)_2$, $CON(C_3H_7)_2$,

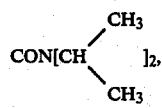

$SO_2NHCH_3$, $SO_2NHC_2H_5$, $SO_2NHC_3H_7$, $SO_2NHC_4H_9$, $SO_2N(CH_3)_2$, $SO_2N(C_2H_5)_2$, $SO_2N(C_3H_7)_2$ or

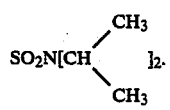

The radicals K of the coupling components are predominantly derived from the thiazole, thiophene, carbazole, indole, pyridine, quinoline, imidazole, pyrimidine or pyrazole series. The coupling components are preferably of the formula III-XIII:

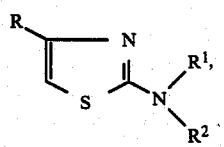

(III)

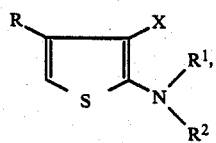

(IV)

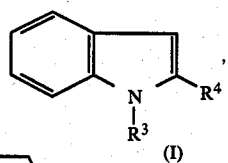

(V)

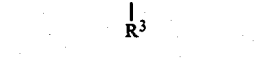

(VI)

(VII)

(VIII)

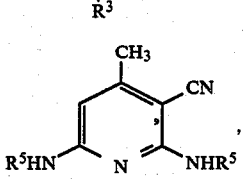

(IX)

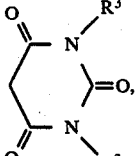

(X)

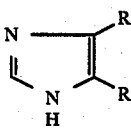

(XI)

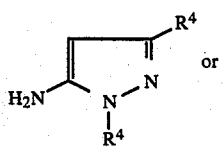

(XII)

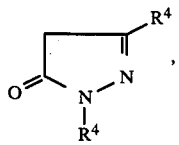

(XIII)

where
- R is hydrogen or $C_1$–$C_4$-alkyl or is thienyl or phenyl which is unsubstituted or substituted by chlorine, bromine, methyl, methoxy, ethoxy, dimethylamino or diethylamino,
- $R^1$ and $R^2$ independently of one another are each hydrogen, unsubstituted or substituted $C_1$–$C_{10}$-alkyl, $C_5$–$C_7$-cycloalkyl, unsubstituted or substituted phenyl, or allyl, or, together with the nitrogen atom to which they are bonded, form a five-membered or six-membered saturated heterocyclic radical,
- $R^3$ is hydrogen or $C_1$–$C_4$-alkyl,
- $R^4$ is hydrogen, $C_1$–$C_4$-alkyl or unsubstituted or substituted phenyl,
- $R^5$ is hydrogen or unsubstituted or substituted $C_1$–$C_{10}$-alkyl, unsubstituted or substituted phenyl or allyl and
- X is cyano, nitro, $C_1$–$C_4$-mono- or dialkylcarbamyl, pyrrolidinocarbonyl, piperidinocarbonyl, morpholinocarbonyl, piperazinocarbonyl, N-($C_1$–$C_4$-alkyl)-piperazinocarbonyl, $C_1$–$C_4$-alkoxycarbonyl, $C_1$–$C_4$-alkylcarbonyl, unsubstituted or substituted phenylcarbonyl, $C_1$–$C_4$-alkylsulfonyl or unsubstituted or substituted phenylsulfonyl.

Dyes which contain coupling components of the formulae III to XI are particularly noteworthy.

All of the alkyl groups in the abovementioned radicals may be either straight-chain or branched.

Where the $C_1$–$C_{10}$-alkyl radicals in $R^1$, $R^2$ and $R^5$ are substituted, suitable substituents are hydroxyl, $C_1$–$C_4$-alkoxy, phenoxy, hydroxysulfonylphenoxy, $C_1$–$C_4$-dialkylamino, pyrrolidino, piperidino, morpholino, piperazino, N-($C_1$–$C_4$-alkyl)-piperazino, phenyl, hydroxysulfonylphenyl, cyano, $C_1$–$C_4$-alkoxycarbonyl and $C_1$–$C_4$-alkanoylamino. The alkyl chain may furthermore be interrupted by from 1 to 4 oxygen atoms.

Where the phenyl radicals in $R^1$, $R^2$, $R^4$, $R^5$ and X are substituted, suitable substituents are halogen, in particular fluorine, chlorine or bromine, $C_1$–$C_4$-alkyl, $C_1$–$C_4$-alkoxy, $C_1$–$C_4$-mono- or dialkylamino, hydroxyl, nitro or hydroxysulfonyl.

$R^1$, $R^2$ and $R^5$ are, for example, $CH_3$, $C_2H_5$, $C_3H_7$, $C_4H_9$, $C_5H_{11}$, $C_6H_{13}$, $C_7H_{15}$, $C_8HHd\ 17$, $C_9H_{19}$, $C_{10}H_{21}$, $C_2H_4OH$, $C_3H_6OH$, $CH_2CHOHCH_3$, $C_2H_4OCH_3$, $C_2H_4OC_2H_5$, $C_2H_4OC_4H_9$, $(CH_2)_3OH$, $(CH_2)_3OCH_3$, $(CH_2)_3OC_2HHd\ 5$, $(CH_2)_3OC_4H_9$, $C_2H_4OC_2H_4OH$, $C_2H_4OC_2H_4OCH_3$, $(CH_2)_3OC_2H_4OH$, $(CH_2)_3OC_2H_4OCH_3$, $(CH_2)_3OC_2H_4OC_2H_5$, $(CH_2)_3OC_2H_4OC_4H_9$, $(CH_2)_3OC_2H_4OC_6H_5$, $(CH_2)_3OC_2H_4OC_6H_4SO_3H$, $C_2H_4N(CH_3)_2$, $C_2H_4N(C_2H_5)_2$, $C_2H_4N(CH_2)_4$, $C_2HHd\ 4N(CH_2)_5$, $(CH_2)_3NHCOCH_3$, $(CH_2)_3N(CH_3)_2$, $(CH_2)_3N(C_2H_5)_2$, $(CH_2)_3N(CH_2)_4$, $(CH_2)_3N(CH_2)_5$, $(CH_2)_3N(C_2H_4)_2O$, $(CH_2)_3N(C_2H_4)_2NCH_3$, $C_2H_4CN$, $C_2H_4COOCH_3$, $C_2H_4COOC_2H_5$, $CH_2$—$CH$=$CH_2$, $CH_2C_6H_5$, $C_2H_4C_6H_5$, $C_2H_4C_6H_4SO_3H$, $C_6H_5$, $C_6H_4Cl$, $C_6H_4Br$, $C_6H_4CH_3$, $C_6H_4OCH_3$, $C_6H_4OC_2H_5$ or $C_6H_4SO_3H$.

$R^1$ and $R^2$ are furthermore, for example, cyclopentyl, cyclohexyl or cycloheptyl.

Where the radicals $R^1$ and $R^2$ together with the nitrogen atom to which they are bonded form a five-membered or six-membered saturated heterocyclic radical, specific examples of radicals are the following: pyrrolidino, piperidino, morpholino, piperazino, N-($C_1$–$C_4$-alkyl)-piperazino and N-(2-hydroxyethyl)-piperazino.

X is, for example, methoxycarbonyl, ethoxycarbonyl, propoxycarbonyl, isopropoxycarbonyl, butoxycarbonyl, isobutoxycarbonyl, sec-butoxycarbonyl, methyl-, ethyl-, propyl-, isopropyl-, butyl-, isobutyl- or sec-butylcarbonyl or -sulfonyl, phenylcarbonyl, phenylsulfonyl, 4-fluorophenyl-, 4-chlorophenyl-, 4-bromophenyl-, 2-methylphenyl-, 4-methoxyphenyl-, 2-ethoxyphenyl-, 4-nitrophenyl- or 4-hydroxysulfonylphenylcarbonyl or -sulfonyl.

Suitable salts of the dyes I are metal or ammonium salts. Metal salts are, in particular, lithium, sodium or potassium salts. For the purposes of the present invention, ammonium salts are those salts which contain either unsubstituted or substituted ammonium cations. Examples of substituted ammonium cations are monoalkyl-, dialkyl-, trialkyl-, tetraalkyl- or benzyltrialkylammonium cations or cations which are derived from nitrogen-containing five-membered or six-membered saturated heterocycles, such as pyrrolidinium, piperidinium, morpholinium, piperazinium or N-alkylpiperazinium cations or their N-monoalkyl- or N,N-dialkyl-substituted products. In general, alkyl is straight-chain or branched $C_1$–$C_{20}$-alkyl which may be substituted by hydroxyl and/or interrupted by oxygen atoms.

To prepare the dyes of the formula I, a diazonium compound of the formula II

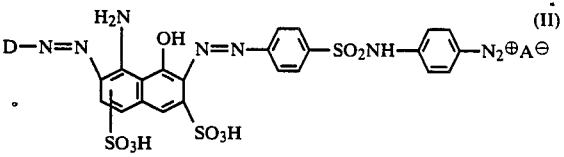

(II)

where D has the above meanings and $A^{\ominus}$ is an anion (eg. chloride or sulfate) can be reacted with a coupling component of the formula III

HK (III)

where K has the above meanings, by a conventional method.

The dyes of the formula I generally have black hues and some of them can be converted to stable liquid formulations. They are particularly useful for dyeing leather and paper. In the form of liquid formulations, they are suitable as inks. Such inks can be used, for example, for the ink jet process, since many of the dyes are distinguished by good water solubility and heat stability.

Compounds of the formula Ia

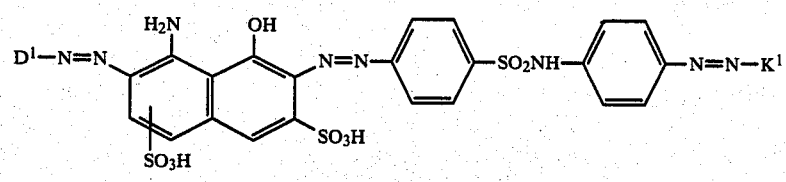 (Ia)

where
D¹ is phenyl which is unsubstituted or substituted by chlorine, bromine, nitro, cyano, hydroxysulfonyl, sulfamyl, $C_1$-$C_4$-mono- or dialkylsulfamyl, pyrrolidinosulfonyl, piperidinosulfonyl, morpholinosulfonyl, piperazinosulfonyl or N-($C_1$-$C_4$-alkyl)-piperazinosulfonyl and K¹ is a radical of a coupling component from the thiazole series, and their salts are of particular importance.

In particular, the thiazole coupling components have the following structure:

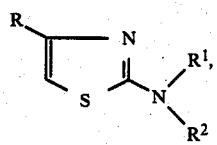

where R, R¹ and R² have the above meanings.

The Examples which follow illustrate the preparation. In the Examples, parts and percentages are by weight, unless stated otherwise.

EXAMPLE 1

11.5 parts of 4-nitroaniline in 85 parts of water and 33 parts by volume of 38% strength hydrochloric acid were diazotized with 27.4 parts by volume of 23% strength sodium nitrite solution at 5° C. After 30 minutes, excess nitrite was removed with amidosulfonic acid. 31.8 parts of 1-amino-8-naphthol-3,6-disulfonic acid were dissolved in 140 parts of water with 50% strength sodium hydroxide solution to give a neutral solution, which was added dropwise to the diazonium salt solution at 10° C. When coupling was complete, the pH was brought to 3.5 with sodium acetate solution. 29.3 parts of 4,4'-diaminobenzenesulfanilide were dissolved in 300 parts of water and 40 parts by volume of 38% strength hydrochloric acid and tetrazotized at 0° C. with 53.7 parts by volume of 23% strength sodium nitrite solution. After 30 minutes, excess nitrite was removed with amidosulfonic acid, and the tetrazonium salt solution was run into the suspension from the first coupling reaction in the course of 10 minutes at 0° C. The pH was brought to 9.5 with 50% strength sodium hydroxide solution and, when coupling on one side was complete (about 30 minutes at 0°/5° C.), the solution of 19.5 parts of 2-diethylamino-4-phenylthiazole in 20 parts by volume of 0.5N hydrochloric acid was run in. The pH was brought to 10 with sodium hydroxide solution, and the reaction mixture was stirred at 5°-10° C. until coupling was complete. It was then heated to 60° C., and the dye was precipitated with sodium chloride solution. Isolation and drying gave 82 parts of a black dye which, in the form of the free acid, is of the formula

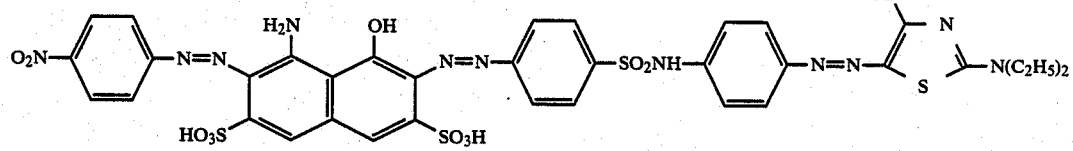

In the form of an 8% strength ink (9:1 water/glycol) it gave black dyeings on paper. The ink was stable at 180° C.

EXAMPLE 2

2-diethylamino-4-phenylthiazole in Example 1 is replaced with an equimolar amount of 2-(4'-hydroxysulfonylphenylamino)-4-phenylthiazole (dissolved in water at pH 9 with sodium hydroxide solution), and the dye was precipitated at pH 4.5. 97 parts of a black dye were obtained which, in the form of the free acid, is of the formula

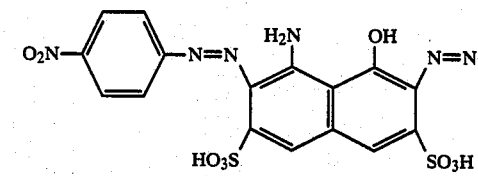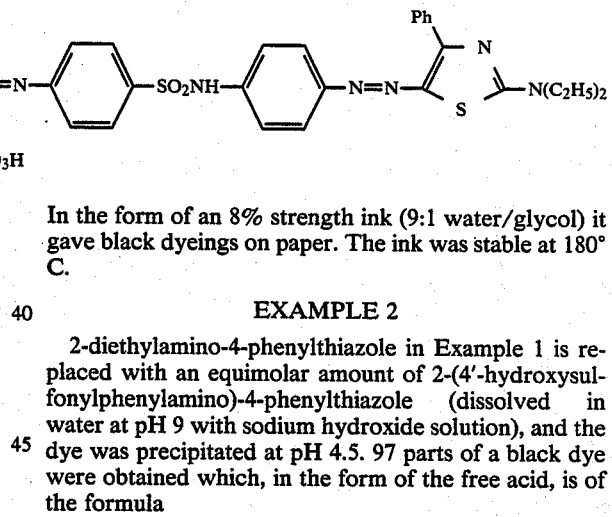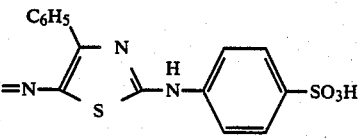

In the form of an ink as described in Example 1, it gave greenish black dyeings on paper. The ink was stable at 240° C.

EXAMPLE 3

1-amino-8-naphthol-3,6-disulfonic acid in Example 1 was replaced with an equal amount of 1-amino-8-naphthol-4,6-disulfonic acid. The dye obtained, in the form of the free acid, is of the formula

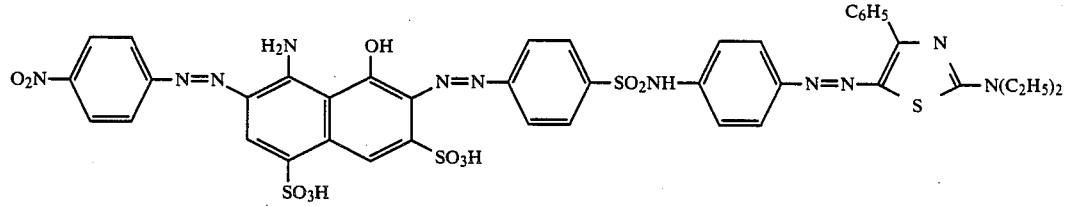

Its hue and its properties are very similar to those of the dye from Example 1.

EXAMPLE 4

8 parts of sulfanilamide in 75 parts of water and 25 parts by volume of 38% strength hydrochloric acid were diazotized with 18 parts by volume of 23% strength sodium nitrite solution at 0° C. After 30 minutes, excess nitrite was destroyed with amidosulfonic acid. 18.7 parts of 1-amino-8-naphthol-3,6-disulfonic acid were dissolved in 100 parts of water with 50% strength sodium hydroxide solution to give a neutral solution, which was added dropwise to the diazonium salt solution at below 10° C. When coupling was complete, the pH was brought to 6–7 with sodium hydroxide solution, after which a tetrazonium salt solution prepared from 17.3 parts of 4,4'-diaminobenzenesulfanilide as described in Example 1 was run in at 0° C. The pH was brought to about 9 with sodium hydroxide solution, and the mixture was stirred for 15 minutes at from 0° to 5° C. When coupling on one side was complete, 9.7 parts of 3-cyano-2-morpholinothiophene in 20 parts by volume of 0.5 N-hydrochloric acid were added dropwise at 0° C. and the pH was brought to 9–10 with sodium hydroxide solution. When coupling was complete, the pH was brought to 5 with 38% strength hydrochloric acid and the dye was precipitated with sodium chloride. Isolation and drying gave 55 parts of a black dye powder which, in the form of the free acid, is of the formula

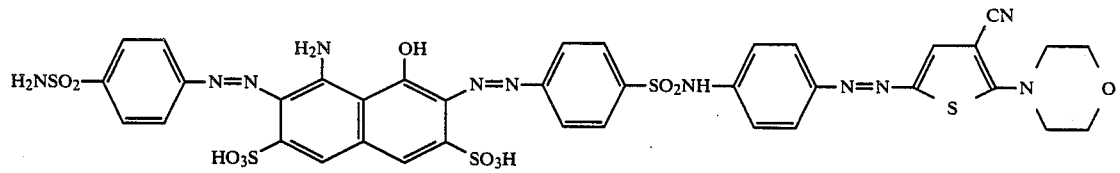

In the form of an ink prepared as described in Example 1, the dye gave bluish black dyeings on paper.

Other examples, prepared by methods similar to those above, are listed in the tables below.

TABLE 1

| Example | Y | K | Hue on paper |
|---|---|---|---|
| 5 | 4-NO₂ | (thiophene with N(C₂H₅)₂) | greenish black |
| 6 | 4-NO₂ | (thiophene with N(CH₃)₂) | greenish black |
| 7 | 4-NO₂ | (C₆H₅-substituted thiophene with NH-phenyl-SO₃H) | black |
| 8 | 4-NO₂ | (thiophene with morpholino) | greenish black |

TABLE 1-continued

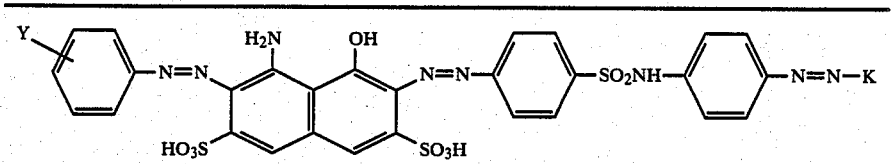

| Example | Y | K | Hue on paper |
|---|---|---|---|
| 9 | 4-$NO_2$ | (2-methylprop-1-enyl)(piperidin-1-yl)methanimine with S | bluish black |
| 10 | 4-$NO_2$ | 9-ethylcarbazol-3-yl | bluish black |
| 11 | 4-$NO_2$ | 9-methyl-2,3,4,4a,9,9a-hexahydrocarbazol-6-yl | reddish black |
| 12 | 4-$NO_2$ | 3-cyano-5-methyl-2-morpholinothiophen-4-yl | greenish black |
| 13 | 4-$NO_2$ | 3-cyano-5-methyl-4-phenyl-2-morpholinothiophen-4-yl | black |
| 14 | 4-$NO_2$ | 3-cyano-5-methyl-2-pyrrolidinothiophen-4-yl | greenish black |
| 15 | 4-$NO_2$ | 3-cyano-5-methyl-4-phenyl-2-pyrrolidinothiophen-4-yl | bluish black |
| 16 | 4-$NO_2$ | 5-hydroxy-3-methyl-4-(phenylazo)pyrazol-4-yl | reddish black |
| 17 | 4-$NO_2$ | 5-hydroxy-3-methyl-4-(4-sulfophenylazo)pyrazol-4-yl | blackish green |

TABLE 1-continued
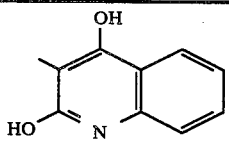
| Example | Y | K | Hue on paper |
|---|---|---|---|
| 18 | 4-NO$_2$ | 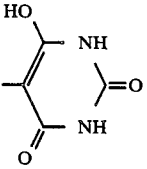 | brownish black |
| 19 | 4-NO$_2$ | 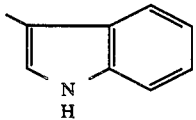 | reddish black |
| 20 | 4-NO$_2$ | 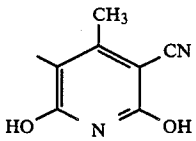 | Bluish black |
| 21 | 4-NO$_2$ | 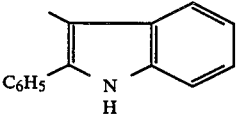 | greenish black |
| 22 | 4-NO$_2$ | 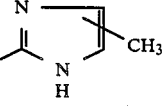 | bluish black |
| 23 | 4-NO$_2$ | 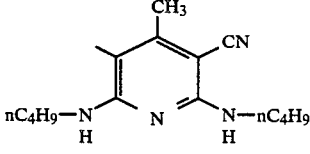 | brownish black |
| 24 | 4-NO$_2$ | 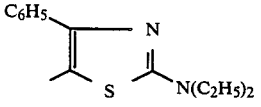 | reddish black |
| 25 | 2-NO$_2$ | 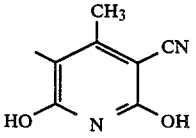 | violet black |
| 26 | 2-NO$_2$ | | greenish black |
| 27 | 2-NO$_2$ | 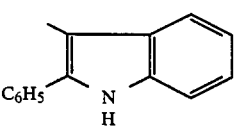 | black |

TABLE 1-continued

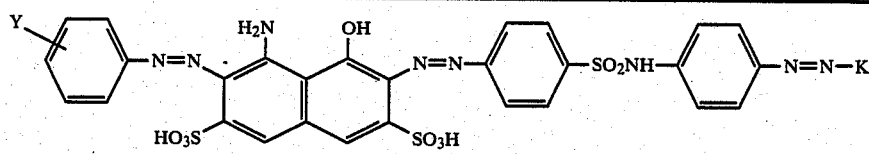

| Example | Y | K | Hue on paper |
|---|---|---|---|
| 28 | 2-NO$_2$ | (imidazole with CH$_3$) | brownish black |
| 29 | 2-NO$_2$ | (barbituric acid derivative) | reddish black |
| 30 | 2-NO$_2$ | (2,4-dihydroxyquinoline) | brownish black |
| 31 | 4-CN | (thiazole with C$_6$H$_5$ and N(C$_2$H$_5$)$_2$) | reddish black |
| 32 | 4-CN | (thiazole with N(C$_2$H$_5$)$_2$) | violet black |
| 33 | 4-CN | (thiazole with morpholine) | greenish black |
| 34 | 4-CN | (thiazole with piperidine) | reddish black |
| 35 | 4-CN | (thiazole with C$_6$H$_5$ and NH-C$_6$H$_4$-SO$_3$H) | black |
| 36 | 4-CN | (thiophene with CN and morpholine) | violet black |
| 37 | 4-CN | (N-ethylcarbazole) | violet black |

TABLE 1-continued

Structure:

Y—(phenyl)—N=N—[naphthalene core with H₂N, OH, HO₃S, SO₃H]—N=N—(phenyl)—SO₂NH—(phenyl)—N=N—K

| Example | Y | K | Hue on paper |
|---------|---|---|--------------|
| 38 | 4-SO₃H | (thiazole with C₆H₅, CH₃, N(C₂H₅)₂) | greenish black |
| 39 | 4-SO₂NH₂ | (thiazole with C₆H₅, CH₃, N(C₂H₅)₂) | reddish black |
| 40 | 4-SO₂NH₂ | (thiazole with C₆H₅, CH₃, NH-C₆H₄-SO₃H) | black |
| 41 | 4-SO₂NH₂ | (thiazole with CN, pyrrolidinyl, CH₃) | bluish black |
| 42 | 4-SO₂NH₂ | (methyl-N-ethylcarbazolyl) | bluish black |

TABLE 2

Structure:

Y—(phenyl)—N=N—[naphthalene core with H₂N, OH, SO₃H, SO₃H]—N=N—(phenyl)—SO₂NH—(phenyl)—N=N—K

| Example | Y | K | Hue on paper |
|---------|---|---|--------------|
| 43 | 4-NO₂ | (thiazole with CH₃, N(C₂H₅)₂) | greenish black |
| 44 | 4-NO₂ | (methyl-N-ethylcarbazolyl) | brownish black |
| 45 | 4-NO₂ | (thiazole with CN, pyrrolidinyl, CH₃) | reddish black |

TABLE 2-continued

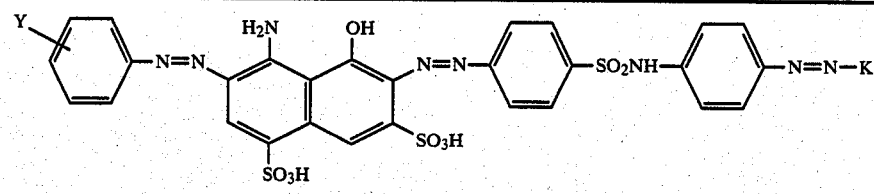

| Example | Y | K | Hue on paper |
|---|---|---|---|
| 46 | 4-NO$_2$ | (3-cyano-4,5-dimethyl-2,6-dihydroxypyridine) | greenish black |
| 47 | 4-NO$_2$ | (2-phenyl-3-methylindole) | reddish black |
| 48 | 4-NO$_2$ | (2,5-dimethyl-imidazole derivative) | brownish black |
| 49 | 2-NO$_2$ | (3-cyano-4,5-dimethyl-2,6-dihydroxypyridine) | brownish black |
| 50 | 2-NO$_2$ | (2-phenyl-3-methylindole) | reddish black |
| 51 | 2-NO$_2$ | (2,5-dimethyl-imidazole derivative) | reddish black |
| 52 | 2-NO$_2$ | (barbituric acid derivative) | reddish black |
| 53 | 2-NO$_2$ | (3-methyl-2,4-dihydroxyquinoline) | brownish black |
| 54 | 2-NO$_2$ | (thiazole with C$_6$H$_5$, CH$_3$, N(C$_2$H$_5$)$_2$) | black |
| 55 | 2-NO$_2$ | (N-ethyl-methylcarbazole) | black |

TABLE 2-continued

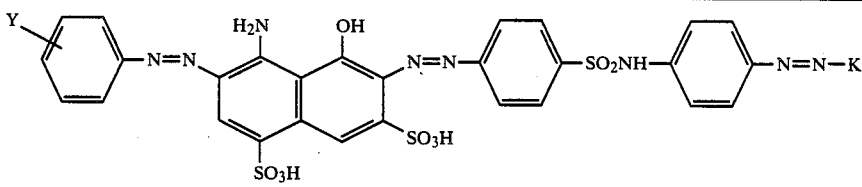

| Example | Y | K | Hue on paper |
|---|---|---|---|
| 56 | 2-NO$_2$ | (thiophene with CN, pyrrolidino substituents) | black |
| 57 | 4-NO$_2$ | (4-hydroxy-3-methylquinolin-2(1H)-one) | reddish black |

We claim:

1. A compound of the formula I

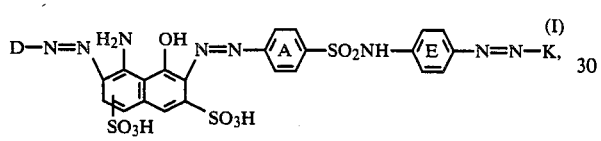

wherein

D is phenyl which is unsubstituted or substituted by fluorine, chlorine, bromine, nitro, cyano, $C_1$–$C_4$-alkylsulfonyl, $C_1$–$C_8$-alkyl, $C_1$–$C_4$-alkoxy, carboxyl, $C_1$–$C_4$-alkoxycarbonyl, hydroxysulfonyl, carbamyl, $C_1$–$C_4$-mono- or dialkylcarbamyl, pyrrolidinocarbonyl, piperidinocarbonyl, morpholinocarbonyl, piperazinocarbonyl, N-($C_1$–$C_4$-alkyl)-piperazinocarbonyl, sulfamyl, $C_1$–$C_4$-mono- or dialkylsulfamyl, pyrrolidinosulfonyl, piperidinosulfonyl, morpholinosulfonyl, piperazinosulfonyl or N-($C_1$–$C_4$-alkyl)-piperazinosulfonyl and K is a radical of a heterocyclic coupling component selected from a group consisting of

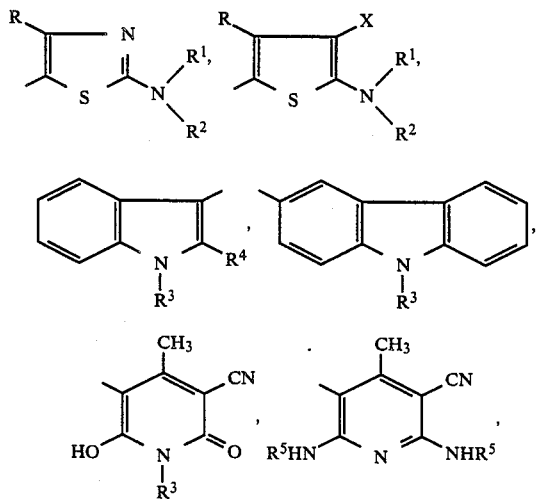

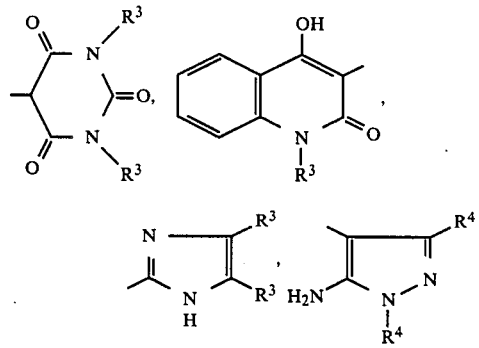

wherein

R is hydrogen or $C_1$–$C_4$-alkyl or is thienyl or phenyl which is unsubstituted or substituted by chlorine, bromine, methyl, methoxy, ethoxy, dimethylamino or diethylamino, $R^1$ and $R^2$ independently of one another are each hydrogen, unsubstituted or substituted $C_1$–$C_{10}$-alkyl, $C_5$–$C_7$-cycloalkyl, unsubstituted or substituted phenyl, or allyl, or, together with the nitrogen atom to which they are bonded, form a five-membered or six-membered saturated heterocyclic radical, $R^3$ is hydrogen or $C_1$–$C_4$-alkyl, $R^4$ is hydrogen, $C_1$–$C_4$-alkyl or phenyl, $R^5$ is hydrogen or unsubstituted or substituted $C_1$–$C_{10}$-alkyl, unsubstituted or substituted phenyl or allyl and X is cyano, nitro, $C_1$–$C_4$-mono- or dialkylcarbamyl, pyrrolidinocarbonyl, piperidinocarbonyl, morpholinocarbonyl, piperazinocarbonyl, N-($C_1$–$C_4$-alkyl)-piperazinocarbonyl, $C_1$–$C_4$-alkoxycarbonyl, $C_1$–$C_4$-alkylcarbonyl, unsubstituted or substituted phenylcarbonyl, $C_1$–$C_4$-alkylsulfonyl or unsubstituted or substituted phenylsulfonyl, and its salts and the rings A and E may furthermore be substituted by methyl, methoxy, chlorine or hydroxy sulfonyl, and its salts.

2. A compound as claimed in claim 1, which is of the formula Ia

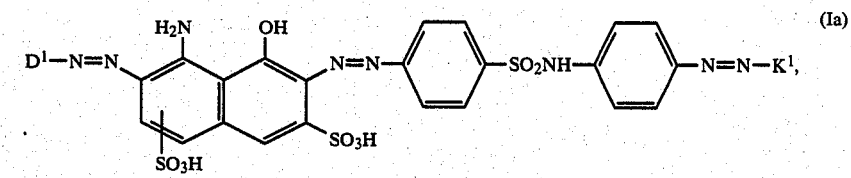

where
D¹ is phenyl which is unsubstituted or substituted by chlorine, bromine, nitro, cyano, hydroxysulfonyl, sulfamyl, $C_1$–$C_4$-mono- or dialkylsulfamyl, pyrrolidinosulfonyl, piperidinosulfonyl, morpholinosulfonyl, piperazinosulfonyl or N-($C_1$–$C_4$-alkyl)-piperazinosulfonyl and $K^1$ is a radical of a coupling component from the thiazole series, and its salts.

3. The method of using the compounds as claimed in claim 1 as dyes in inks.